(12) United States Patent
Jang et al.

(10) Patent No.: US 10,752,285 B2
(45) Date of Patent: Aug. 25, 2020

(54) APPARATUS AND METHOD FOR CONTROLLING ROTATION OF VEHICLE IN CONSIDERATION OF SLIP

(71) Applicants: Hyundai Motor Company, Seoul (KR); Kia Motors Corporation, Seoul (KR)

(72) Inventors: Young Jin Jang, Gyeongsangbuk-do (KR); Hyung Souk Kang, Seoul (KR); Soung Han Noh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 264 days.

(21) Appl. No.: 16/017,488

(22) Filed: Jun. 25, 2018

(65) Prior Publication Data

US 2019/0193781 A1    Jun. 27, 2019

(30) Foreign Application Priority Data

Dec. 22, 2017  (KR) .......................... 10-2017-0177868

(51) Int. Cl.
*B62D 6/00* (2006.01)
*B60W 40/103* (2012.01)
(Continued)

(52) U.S. Cl.
CPC ........... *B62D 6/005* (2013.01); *B60W 30/045* (2013.01); *B60W 40/103* (2013.01); *B60Q 1/346* (2013.01);
(Continued)

(58) Field of Classification Search
CPC .......................... B60G 17/016; B60G 17/019; B60G 17/0195; B60G 7/006; B60T 7/12;
(Continued)

(56) References Cited

U.S. PATENT DOCUMENTS

2004/0040779 A1* 3/2004 Bishop ..................... B62D 3/12
                                                      180/443
2004/0100373 A1* 5/2004 Ponziani .................. B60Q 1/40
                                                      340/476

(Continued)

FOREIGN PATENT DOCUMENTS

KR    20010059067 A    7/2001
KR    20080032288 A    4/2008

OTHER PUBLICATIONS

Rajamani, et al., Vehicle Dynamics and Control, p. 39, published Dec. 21, 2011.

*Primary Examiner* — Behrang Badii
(74) *Attorney, Agent, or Firm* — Mintz Levin Cohn Ferris Glovsky and Popeo, P.C.; Peter F. Corless

(57) ABSTRACT

An apparatus and a method are provided for controlling rotation of a vehicle in consideration of slip. The apparatus includes a radius of curvature setting unit that sets a target radius of curvature of rotation of the vehicle while the vehicle is being driven and a radius of curvature calculation unit that estimates an actual radius of curvature of a traveling vehicle based on forward speed and lateral acceleration of the vehicle. Additionally, a radius of curvature adjustment unit adjusts a yaw direction rotation moment of the vehicle based on a difference between the target radius of curvature set by the radius of curvature setting unit and the estimated radius of curvature estimated by the radius of curvature calculation unit to adjust the radius of curvature of rotation of the vehicle.

15 Claims, 3 Drawing Sheets

(51) Int. Cl.
*B60W 30/045* (2012.01)
*B60Q 1/34* (2006.01)
*B60Q 1/40* (2006.01)
*B60W 40/10* (2012.01)
*B60W 30/14* (2006.01)
*B61L 25/02* (2006.01)
*B62D 3/12* (2006.01)

(52) U.S. Cl.
CPC ............... *B60Q 1/40* (2013.01); *B60W 30/14* (2013.01); *B60W 40/10* (2013.01); *B60W 2510/207* (2013.01); *B60W 2520/10* (2013.01); *B60W 2520/125* (2013.01); *B60W 2720/14* (2013.01); *B61L 25/025* (2013.01); *B61L 25/026* (2013.01); *B62D 3/12* (2013.01)

(58) Field of Classification Search
CPC ........ B60T 8/1755; B60T 8/241; B60T 8/246; G06F 19/00; G05D 1/00; B60W 40/06; B60W 40/064; B60W 40/068; B60W 30/14; B60W 40/00; B60W 40/10; B60W 40/13; B60W 40/072; B60W 30/06; B60W 30/045; B60W 40/103; B60W 2510/207; B60W 2520/10; B60W 2520/125; B60W 2720/14; B60Q 1/40; B60Q 1/346; B62D 3/12; B62D 6/003; B62D 6/005; B62D 6/02; B62D 1/166; B62D 17/00; B62D 6/002; B62D 7/159; B60C 11/00; B60C 3/06; B60C 19/001; B60C 11/0083; B66F 9/07572; B66F 9/07568; B66F 17/003; H04N 5/23296; H04N 7/18; F16C 19/522; F16C 41/007; G01P 3/446; G01P 3/38; B60L 15/2036; B60L 50/51; B60L 1/003; G06K 9/00335; G06K 9/52; G06K 9/66; G06K 9/00791; G06T 7/70; G06T 7/10; G06T 7/20; G06T 7/60; B60R 1/00

See application file for complete search history.

(56) References Cited

U.S. PATENT DOCUMENTS

| | | | |
|---|---|---|---|
| 2011/0029180 A1* | 2/2011 | El Fassi | B61L 25/025 701/23 |
| 2014/0309855 A1* | 10/2014 | Tran | B60Q 1/38 701/36 |
| 2019/0111935 A1* | 4/2019 | Jang | B60W 40/06 |

* cited by examiner

APPARATUS AND METHOD FOR CONTROLLING ROTATION OF VEHICLE IN CONSIDERATION OF SLIP

CROSS REFERENCE TO RELATED APPLICATION

The present application claims priority to Korean Patent Application No. 10-2017-0177868, filed Dec. 22, 2017, the entire contents of which is incorporated herein for all purposes by this reference.

BACKGROUND

1. Technical Field

The present disclosure relates to an apparatus and method for controlling rotation of a vehicle in consideration of slip, and more particularly, to an apparatus and method for controlling rotation of a vehicle in consideration of slip, for preventing vehicle running stability from being degraded and preventing increased danger due to a difference between a target radius of curvature determined via manipulation of a steering wheel of a vehicle and a radius of curvature of a vehicle that actually travels when the vehicle slips like understeering or oversteering as the vehicle turns while accelerating or decelerating.

2. Description of the Related Art

In general, when a vehicle travels on a curved road or a driver steers a vehicle, a radius of curvature needs to be determined with respect to a vehicle to stably drive the vehicle and vehicle driving needs to be controlled according to the determined radius of curvature, in some cases. For example, neutral steering in which a vehicle travels while maintaining a target radius of curvature, which is determined based on a steering angle of a steering wheel, may be performed during cruise control of the vehicle. However, when a vehicle is steered while reducing vehicle speed, yaw occurs in the vehicle and, simultaneously, oversteering in which the vehicle slips with a smaller radius of curvature than the target radius of curvature, which is set via manipulation of a steering wheel, occurs. When a vehicle rotates or turns while vehicle speed is increased, understeering in which the vehicle slips with a greater radius of curvature than a target radius of curvature, which is set based on a steering angle of a steering wheel, occurs.

Accordingly, when a vehicle rotates while the vehicle slips due to oversteering or understeering, the vehicle actually turns at a smaller or greater angle than the case in which yaw of the vehicle occurs based on a steering angle of a steering wheel and, accordingly, the target radius of curvature, set based on the steering angle of the steering wheel, and an actual radius of curvature of the vehicle that rotates are different. In addition, when the target radius of curvature, set based on the steering angle of the steering wheel, and an actual radius of curvature of the vehicle that turns are different, vehicle running stability is degraded and a driver may experience a feeling of danger when the vehicle slips in some cases.

SUMMARY

An object of the present disclosure is to provide an apparatus and method for controlling rotation of a vehicle in consideration of slip, for preventing vehicle running stability from being degraded and preventing increased danger due to a difference between a target radius of curvature determined via manipulation of a steering wheel of a vehicle and a radius of curvature of a vehicle that actually travels when the vehicle slips like understeering or oversteering as the vehicle turns while accelerating or decelerating.

According to an exemplary embodiment of the present disclosure, an apparatus for controlling rotation of a vehicle in consideration of slip may include a radius of curvature setting unit configured to set a target radius of curvature of rotation of the vehicle during vehicle rotation (e.g., turning of the vehicle), a radius of curvature calculation unit configured to estimate an actual radius of curvature of a traveling vehicle based on forward speed and lateral acceleration of the vehicle, and a radius of curvature adjustment unit configured to adjust a yaw direction rotation moment of the vehicle based on a difference between the target radius of curvature set by the radius of curvature setting unit and the estimated radius of curvature estimated by the radius of curvature calculation unit to adjust the radius of curvature of rotation of the vehicle.

The radius of curvature calculation unit may be configured to estimate a radius of curvature according to an equation $$\rho = \frac{V_x^2}{A_y}$$

based on the forward speed and the lateral acceleration, where $\rho$ is an estimated radius of curvature, $V_x$ is the forward speed, and $A_y$ is the lateral acceleration.

The forward speed may be detected by a speedometer installed within the vehicle and the lateral acceleration may be detected using a gyro sensor installed within the vehicle. The radius of curvature setting unit sets the target radius of curvature based on a steering angle via manipulation of a steering wheel of the vehicle. The radius of curvature setting unit may be configured to set the target radius of curvature according to an equation $$\rho^* = \frac{V_{x0}}{\gamma_0}$$

where $\rho^*$ is the target radius of curvature, $V_{x0}$ is forward speed at a time point when the vehicle begins to rotate or turn, and $\gamma_0$ is a yaw rate at a time point when the vehicle begins to rotate or turn.

The radius of curvature adjustment unit may include a proportional integral controller configured to determine a target value of a yaw direction rotation moment of the vehicle in such a way that the difference between the target radius of curvature and the estimated radius of curvature is 0. The radius of curvature adjustment unit may distribute torque of left and right driving motors of the vehicle in a range of a torque command value of the vehicle to generate a yaw direction rotation moment of the vehicle corresponding to the target value. The radius of curvature adjustment unit may be configured to adjust a rotation direction and rotation size of a steering motor of the vehicle to generate a yaw direction rotation moment of the vehicle corresponding to the target value.

According to another exemplary embodiment of the present disclosure, a method of controlling rotation of a vehicle in consideration of slip may include setting a target radius of curvature of rotation of the vehicle during vehicle driving, estimating an actual radius of curvature of a traveling vehicle based on forward speed and lateral acceleration of the vehicle, and adjusting a yaw direction rotation moment of the vehicle based on a difference between the target radius of curvature and the estimated radius of curvature estimated in the estimating and a torque command value of the vehicle to adjust the radius of curvature of rotation of the vehicle.

The estimating may include estimating a radius of curvature according to an equation $$\rho = \frac{V_x^2}{A_y}$$

based on the forward speed and the lateral acceleration, where $\rho$ is an estimated radius of curvature, $V_x$ is the forward speed, and $A_y$ is the lateral acceleration.

The setting of the target radius of curvature may include setting the target radius of curvature based on a steering angle via manipulation of a steering wheel of the vehicle. The setting of the target radius of curvature may include setting the target radius of curvature according to an equation $$\rho^* = \frac{V_{x0}}{\gamma_0}$$

where $\rho^*$ is the target radius of curvature, $V_{x0}$ is forward speed at a time point when the vehicle beings to rotate, and $\gamma_0$ is a yaw rate at a time point when the vehicle begins to rotate.

The adjusting of the radius of curvature may include determining a target value of a yaw direction rotation moment of the vehicle in such a way that the difference between the target radius of curvature and the estimated radius of curvature is 0 via proportional integral control. The adjusting of the radius of curvature may include distributing torque of left and right driving motors of the vehicle in a range of a torque command value of the vehicle to generate a yaw direction rotation moment of the vehicle corresponding to the target value. The adjusting of the radius of curvature may include adjusting a rotation direction and rotation size of a steering motor of the vehicle to generate a yaw direction rotation moment of the vehicle corresponding to the target value.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an apparatus and method for controlling rotation of a vehicle in consideration of slip according to exemplary embodiments of the present disclosure is described with reference to the accompanying drawings.

Figure 1:
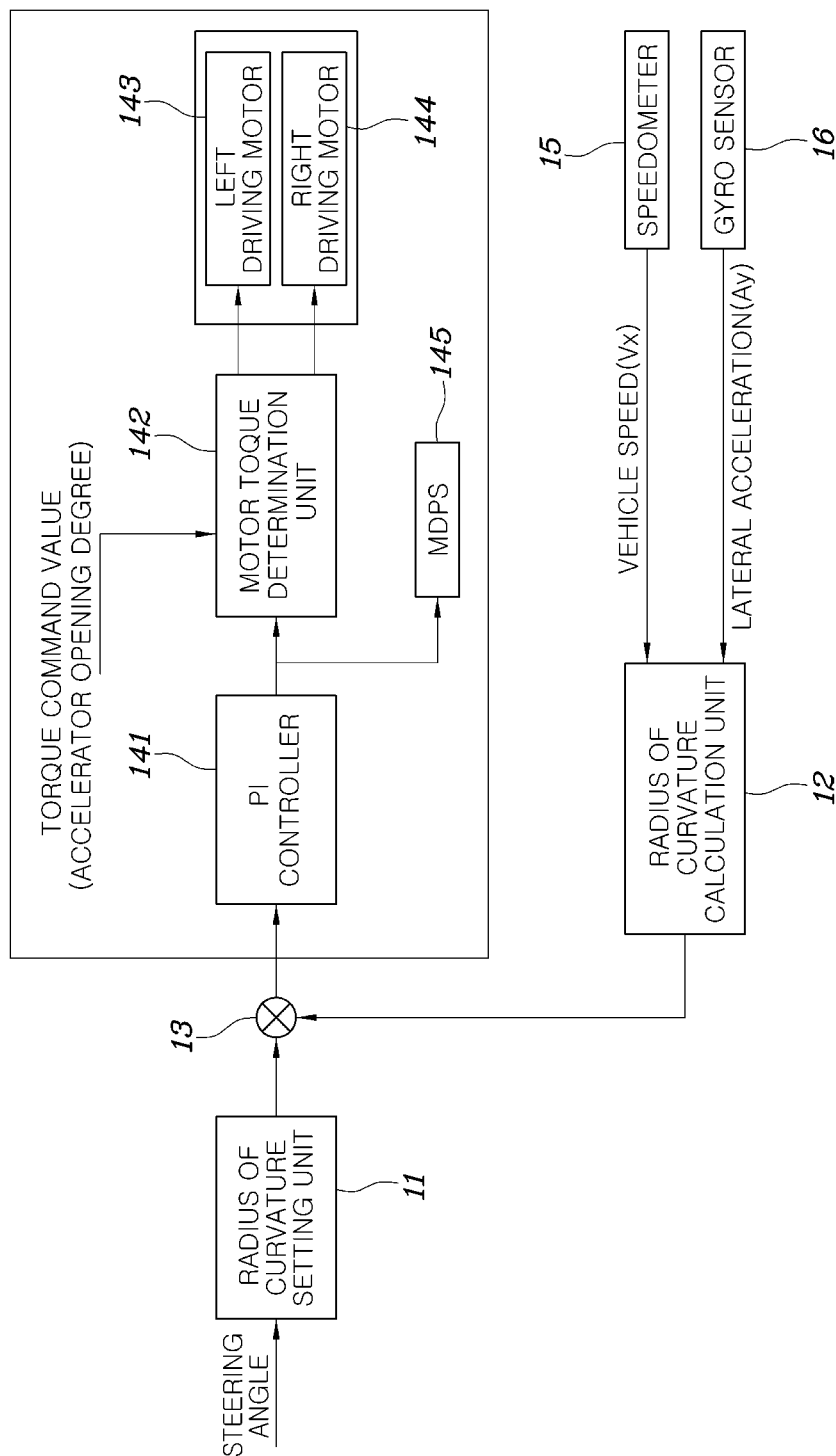
FIG. 1 is a block diagram showing a structure of an apparatus for controlling rotation of a vehicle in consideration of slip according to an exemplary embodiment of the present disclosure.

FIG. 1 is a block diagram showing a structure of an apparatus for controlling rotation of a vehicle in consideration of slip according to an exemplary embodiment of the present disclosure. The apparatus described herein below may be operated by an overall controller having a processor and a memory. Referring to FIG. 1, an apparatus for controlling rotation of a vehicle in consideration of slip according to an exemplary embodiment of the present disclosure may include a radius of curvature setting unit 11 configured to set a target radius of curvature of rotation of a vehicle when the vehicle rotates (e.g., turns), a radius of curvature calculation unit 12 configured to estimate an actual radius of curvature of a traveling vehicle based on forward speed and lateral acceleration of the vehicle, and a radius of curvature adjustment unit 14 configured to adjust a yaw direction rotation moment of the vehicle based on a difference between the target radius of curvature set by the radius of curvature setting unit 11 and the estimated radius of curvature estimated by the radius of curvature calculation unit 12 to adjust the radius of curvature of rotation of the vehicle.

The radius of curvature setting unit 11 may be configured to derive a target radius of curvature of a vehicle, which is set based on a steering angle of a steering wheel manipulated by a vehicle driver, or derive a target radius of curvature of the vehicle according to equation 1 provided below. When a driver rotates the steering wheel, a steering angle of the vehicle may be determined based on a rotation degree of the steering wheel and a front wheel of the vehicle may be rotated to rotate or turn the traveling vehicle. The set radius of curvature derived by the radius of curvature setting unit 11 may be a value determined based on the steering angle of the vehicle and may correspond to a vehicle radius of curvature with a desired size via manipulation of a steering wheel of a driver without consideration of slip that occurs during vehicle driving.

A correspondence relationship between the vehicle steering angle and the vehicle radius of curvature may be predetermined and stored in the radius of curvature setting unit 11 in the form of data map. According to another exemplary embodiment of the present disclosure, a target radius of curvature may be set according to Equation 1 below.

$$\rho^* = \frac{V_{x0}}{\gamma_0} \qquad \text{Equation 1}$$

In Equation 1 above, $\rho^*$ is a target radius of curvature, $V_{x0}$ is forward speed at a time point when a vehicle begins to rotate, and $\gamma_0$ is yaw rate of the vehicle at a time when a vehicle begins to rotate.

Equation 1 above may be derived from a relational formula between vehicle slip and a radius of curvature, which is to be described later, and may be a formula for determining a target radius of curvature using forward speed and yaw rate that are detected by a speedometer 15 and a gyro sensor 16 installed within a vehicle, respectively, after an steering angle is changed via manipulation of a steering wheel of the vehicle, that is, at a time point when the vehicle begins to rotate or turn, which is described below in more detail. The radius of curvature calculation unit 12 may be configured to estimate an actual radius of curvature of a traveling vehicle.

As a method of estimating an actual radius of curvature of a traveling vehicle, various methods are well known but a radius of curvature is estimated based on a yaw rate of the vehicle in most of the known methods of estimating a radius of curvature. A radius of curvature scheme based on a yaw rate is not capable of considering vehicle slip and, thus, vehicle slip is not disadvantageously considered in the estimated radius of curvature.

Figure 2:
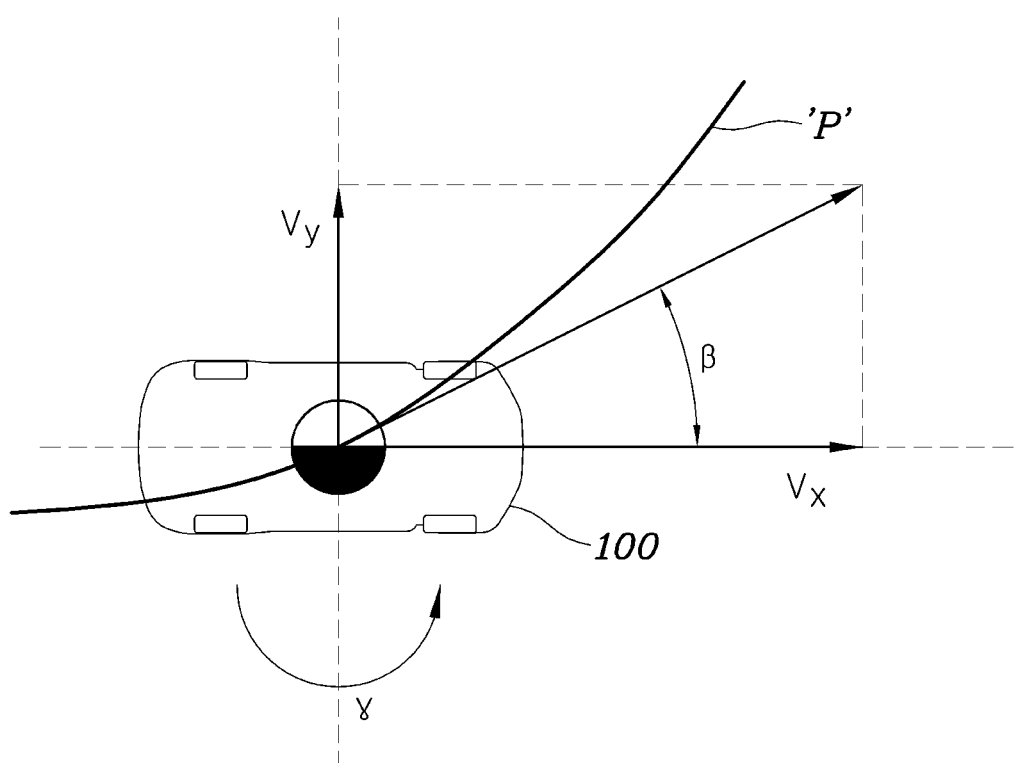
FIG. 2 is a diagram showing an example of when the vehicle slips while traveling on a curved path, according to an exemplary embodiment of the present disclosure.

FIG. 2 is a diagram showing an example of when a vehicle slips while traveling on a curved path. In FIG. 2, a reference numeral 'P' is a moving path of a vehicle 100, the x-axis is a forward direction of a vehicle, the y-axis is a lateral direction of the vehicle, and an arrow indicates a direction in which the vehicle is moved, that is, a tangential direction at one point on the moving path P'. When the vehicle needs to be moved along the path 'P' without slip, the x-axis and the arrow need to be a straight line with the same direction but, when the vehicle slips as shown in FIG. 2, the x-axis and the arrow are different due to slip by an angle β.

In other words, a yaw rate measured by a yaw sensor installed within a vehicle may be derived from a yaw rate γ with which the vehicle 100 yaws to the x-axis but an actual vehicle may be moved along the arrow and, thus, when a radius of curvature of the vehicle is measured based on the yaw rate, the angle β due to slip is not capable of being applied. The radius of curvature calculation unit 12 applied to an exemplary embodiment of the present disclosure may thus be configured to estimate the radius of curvature based on the forward speed and lateral acceleration of the vehicle in consideration of change in vehicle radius of curvature to which the yaw rate is not applied.

The radius of curvature calculation unit 12 may be configured to determine a radius of curvature ρ according to Equation 2 below.

$$\rho = \frac{V_x}{\dot{\beta} + \gamma} = \frac{V_x^2}{A_y} \qquad \text{Equation 2}$$

An intermediate term in Equation 2 above is an expression for deriving a pre-known radius of curvature and indicates that a radius of curvature is capable of being measured when a change rate of an angle β due to slip is considered.

However, according to the present disclosure, a radius of curvature may be estimated in consideration of a lateral acceleration as in a rightmost term of Equation 2 above using a physical relational formula. In a movement relation when a vehicle slips as shown in FIG. 2, acceleration $a_y$ in the Y-axis direction (lateral direction) may be represented according to Equation 3 below.

$$a_y = V_x\gamma + \dot{V}_y = V_x\gamma + V_x\dot{\beta} \qquad \text{Equation 3}$$

Acceleration $A_y$ measured in the Y-axis direction (lateral direction) may be determined based on Equation 3 above, according to Equation 4 below and, when Equation 4 below is modified to Equation 5 below and substituted with an intermediate term in Equation 1 above, a rightmost term in Equation 1 above may be derived.

$$A_y = (\gamma + \dot{\beta})V_x \qquad \text{Equation 4}$$

$$\frac{1}{\dot{\beta} + \gamma} = \frac{V_x}{A_y} \qquad \text{Equation 5}$$

As in Equation 2 above, the radius of curvature calculation unit 12 may be configured to determine a radius of curvature based on a lateral acceleration $A_y$ of a vehicle and forward speed $V_x$ of the vehicle. In particular, the lateral acceleration $A_y$ of the vehicle and the forward speed $V_x$ of the vehicle may be derived using an acceleration sensor (gyro sensor) and a speed sensor that are each installed within the vehicle. In FIG. 1, a reference numeral '15' may be a speedometer of the vehicle as a component for detecting and outputting the forward speed $V_x$ of the vehicle and a reference numeral '16' may be a gyro sensor of the vehicle as a component for detecting and outputting the lateral acceleration $A_y$ of the vehicle.

Accordingly, the radius of curvature calculation unit 12 may not require other additional hardware to calculate a radius of curvature in consideration of slip of the vehicle and may be configured to derive an actual radius of curvature of the vehicle in consideration of slip of the vehicle using information detected using the speedometer 15 and the gyro sensor 16 of the vehicle, which are pre-installed for other purposes (e.g., already mounted within the vehicle as existing components).

Further, errors in the target radius of curvature output from the radius of curvature setting unit 11 and the estimated radius of curvature output by the radius of curvature calculation unit 12 may be calculated by a subtraction unit 13 and may be input to the radius of curvature adjust unit 14. Equation 1 above may be derived from Equation 2 above. A vehicle does not slip at a time point when the vehicle begins to rotate and, thus, $\dot{\beta}$ may be assumed to be 0 in an intermediate term in Equation 2 above. In other words, the radius of curvature derived assuming $\dot{\beta}$ to be 0 in Equation 2 above may be set to a target radius of curvature and, in this case, the derived equation may corresponding to Equation 1 above.

The radius of curvature adjust unit 14 may be configured to determine a yaw direction rotation moment of the vehicle for removing a difference between the target radius of curvature and the estimated radius of curvature and operate the vehicle to generate the rotation moment. The radius of curvature adjust unit 14 may include a proportional integral controller 141 and may be configured to output a target value of a yaw direction rotation moment of a vehicle for removing an error between the target radius of curvature and the estimated radius of curvature via proportional integral control.

According to an exemplary embodiment of the present disclosure, to operate the vehicle to reach the target value of the rotation moment, the radius of curvature adjust unit 14 may be configured to adjust torque of a leftmost driving motor of the vehicle to relative the target value of the yaw direction rotation moment in the vehicle. Such control may be executed by a motor torque determination unit 142 and left and right driving motors 143 and 144 disposed at left and right driving wheels of the vehicle. In particular, the motor torque determination unit 142 may be configured to receive the target value of the yaw direction rotation moment and a vehicle torque command value and distribute torque of the left and right driving motors 143 and 144 for achieving the rotation moment target value in a range of the torque command value.

In other words, the motor torque determination unit 142 may be configured to determine and adjust torque of a motor (referred to as "driving motor") to provide power to a driving wheel of a vehicle based on an amount (referred to as "accelerator opening degree") by which a driver engages an accelerator pedal of the vehicle.

According to an exemplary embodiment of the present disclosure, the separate driving motors 143 and 144 may be configured to drive left and right driving wheels of the vehicle, respectively. Additionally, the motor torque determination unit 142 may be configured to operate the driving motors, respectively, based on the torque command value determined based on an accelerator opening degree and the target value of the yaw direction rotation moment output by the proportional integral controller 141. For example, the torque command value input to the motor torque determination unit 142 may be a torque command value that corresponds to sum torque of the left driving motor 143 and the right driving motor 144 and the motor torque determination unit 142 may be configured to distribute the torque command value in a range of the torque command value to determine torque of the two driving motors 143 and 144. Torque of the motor torque determination unit 142 may be distributed based on the target value of the yaw direction rotation moment.

Under the assumption that a vehicle is ideally operated at the same speed based on a steering angle determined by a steering wheel, a difference between the target radius of curvature set by the radius of curvature setting unit 11 and the estimated radius of curvature estimated by the radius of curvature calculation unit 12 may be considered to be caused by an angle difference generated due to slip of the vehicle. Accordingly, the motor torque determination unit 142 may be configured to set different torque of the left and right driving motors 143 and 144 in a range of the torque command value to remove an angle difference generated due to slip and to allow the vehicle to rotate without slip based on steering wheel manipulation of a driver.

According to another exemplary embodiment of the present disclosure, the radius of curvature adjust unit 14 may be configured to adjust a rotation direction and rotation size of a steering motor 145 included in a motor driven power steering (MDPS) of the vehicle to operate the vehicle to realize the target value of the yaw direction rotation moment. According to such control, forward speed and lateral acceleration of the vehicle may be continuously detected while the vehicle travels and the radius of curvature calculation unit may be configured to calculate and feedback the estimated radius of curvature using the forward speed and the lateral acceleration to remove influence of slip during vehicle rotation and to perform vehicle rotation to follow the steering angle set by the steering wheel.

Figure 3:
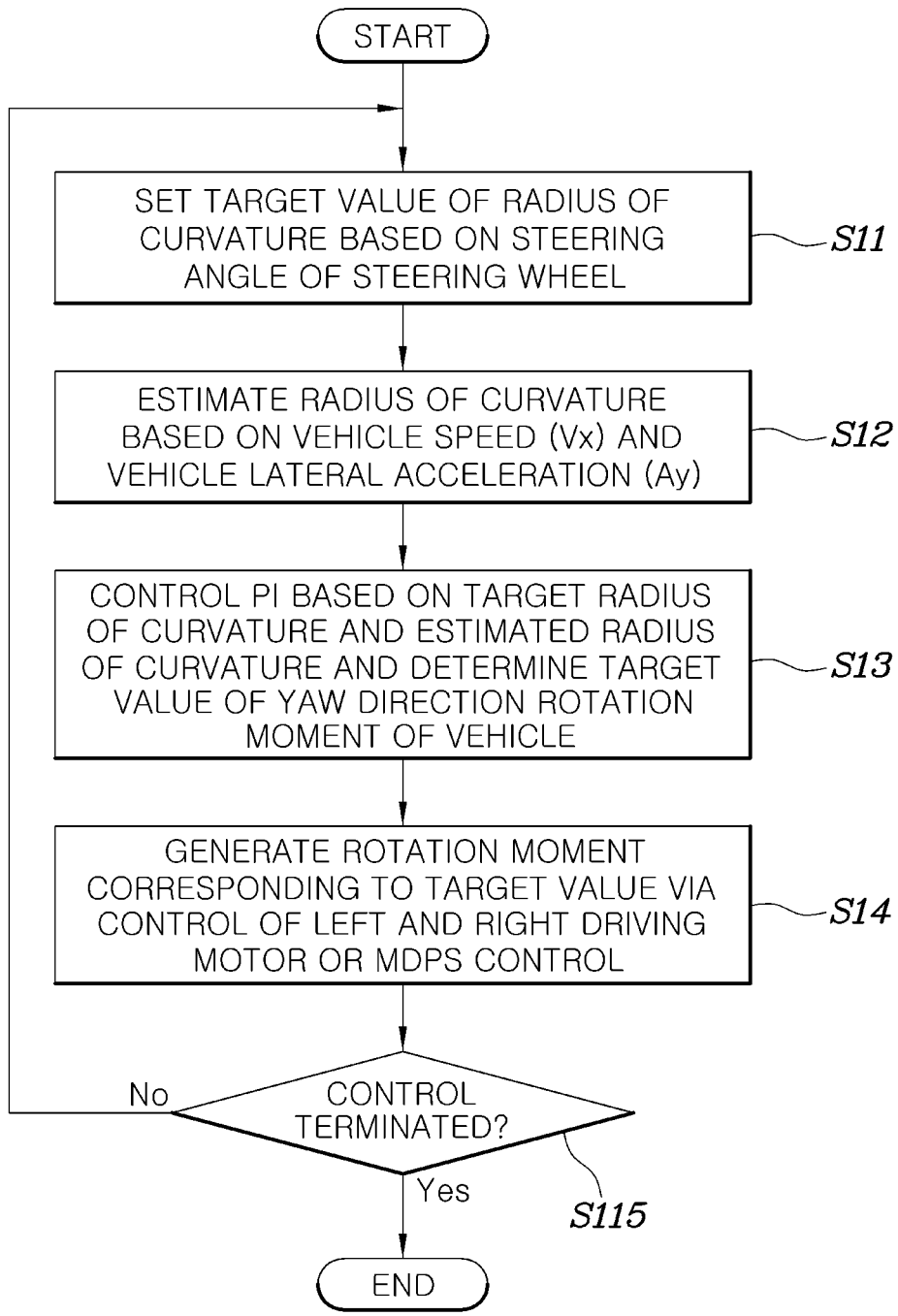
FIG. 3 is a flowchart showing a method of controlling rotation of a vehicle in consideration of slip according to an exemplary embodiment of the present disclosure.

FIG. 3 is a flowchart showing a method of controlling rotation of a vehicle in consideration of slip according to an exemplary embodiment of the present disclosure. The method of controlling rotation of a vehicle in consideration of slip according to an exemplary embodiment of the present disclosure may be embodied via the aforementioned operation of the apparatus for controlling rotation of a vehicle of FIG. 1. Referring to FIG. 3, the method of controlling rotation of a vehicle in consideration of slip according to an exemplary embodiment of the present disclosure may be started by setting a target radius of curvature of rotation of a vehicle while the vehicle rotates by the radius of curvature setting unit 11 (S11).

Further, the radius of curvature calculation unit 12 may be configured to estimate an actual radius of curvature of a traveling vehicle according to Equation 2 above based on the forward speed and the lateral acceleration of the vehicle and generate the estimated radius of curvature (S12). The radius of curvature adjust unit 14 may then be configured to determine a target value for adjusting a yaw direction rotation moment of the vehicle (S13) based on the difference between the target radius of curvature set in the setting (S11) and the estimated radius of curvature estimated in the estimating (S12) and adjust torque of the left and right driving motors 143 and 144 included in left and right driving wheels of the vehicle or adjust a rotation direction and rotation size of the steering motor 145 included in the MDPS and operate the vehicle to reach the target value of the yaw direction rotation moment (S14).

Hereinafter, a principle of adjusting a radius of curvature of rotation of a vehicle using a yaw direction rotation moment of the vehicle is described briefly. According to Vehicle Dynamics and Control (written by Rajamani and Rajesh) that is the document related to vehicle control, a state equation of a vehicle system may be determined according to Equation 6 below.

$$\dot{x} = A(v_x)x + B(v_x)u, \qquad \text{Equation 6}$$

-continued $$x = \begin{bmatrix} \beta \\ \gamma \end{bmatrix}, u = \begin{bmatrix} \delta \\ M_z \end{bmatrix},$$

$$A(v_x) = \begin{bmatrix} -\dfrac{2(C_f + C_r)}{mv_x} & -1 - \dfrac{2(l_f C_f - l_r C_r)}{mv_x^2} \\ -\dfrac{2(l_f C_f - l_r C_r)}{I} & -\dfrac{2(l_f^2 C_f + l_r^2 C_r)}{Iv_x} \end{bmatrix},$$

$$B(v_x) = \begin{bmatrix} \dfrac{2C_l}{mv_x} & 0 \\ \dfrac{2l_f C_f}{I} & \dfrac{1}{I} \end{bmatrix}$$

In Equation 6 above, $\delta$ is an angle of a steering wheel of a vehicle, $\beta$ is a slip angle of the vehicle, $\gamma$ is a yaw rate, $V_x$ is forward speed of the vehicle, $A_y$ is lateral acceleration of the vehicle, $C_r$ and $C_f$ are stiffness constants, $M_z$ is a Z-axis, i.e., yaw direction rotation moment, and $l_r$ and $l_f$ are x-axis direction distances to rear and front wheels of the vehicle from a center of gravity. In particular, the x-axis is an axis set in a forward and backward direction of the vehicle, the y-axis is an axis set in a horizontal direction of the vehicle, and the z-axis is an axis set in a vertical direction of the vehicle (refer to FIG. 2).

As seen from Equation 6 above, $\beta$ and $\gamma$ of a vehicle may be adjusted through $\delta$ and $M_z$ that are external input parameters. In particular, the equation shows that $\beta$ and $\gamma$ of the vehicle may be adjusted by adjusting $\delta$ and $\gamma$ may be adjusted by adjusting $M_z$ but $\beta$ of the vehicle is not capable of being adjusted.

Referring to Equation 2 above, the radius of curvature may be adjusted via a change rate of $\beta$ and the sum of $\gamma$ of the vehicle and $\beta$ and $\gamma$ may be independent parameters and may not affect states thereof. The adjustable $M_z$ may change $\gamma$ and, thus, since $V_x$ and $\beta$ are not affected by a change in yaw rate, $M_z$ may be adjusted to control a radius of curvature.

As described above, the apparatus and method for controlling rotation of a vehicle in consideration of slip according to various exemplary embodiments of the present disclosure may derive a difference between a target radius of curvature based on a steering angle determined via manipulation of a steering wheel and an estimated radius of curvature detected using forward speed and lateral acceleration of a vehicle that actually travels to detect influence of slip while the vehicle rotates or turns. The estimated radius of curvature is a radius of curvature determined by considering an angle due to slip of the vehicle and, thus, the difference between the target radius of curvature and the estimated radius of curvature may be generated due to influence of vehicle slip.

The apparatus and method for controlling rotation of a vehicle in consideration of slip according to various exemplary embodiments of the present disclosure may generate a target value of a yaw direction rotation moment of a vehicle via proportional integral control to remove influence (e.g., difference between target radius of curvature and estimated radius of curvature) of slip during vehicle rotation and operate the vehicle to realize the target value. Using such a control procedure, the apparatus and method for controlling rotation of a vehicle in consideration of slip according to various exemplary embodiments of the present disclosure may remove influence of slip during vehicle rotation and, in this case, a radius of curvature of the vehicle that actually rotates may correspond to a target radius of curvature set via manipulation of a steering wheel of the vehicle.

According to the apparatus and method for controlling rotation of a vehicle in consideration of slip, a target value of a yaw direction rotation moment of a vehicle may be set to remove a difference between a target radius of curvature set via manipulation of a steering wheel of a driver during vehicle rotation and an actual radius of curvature based on forward speed and lateral acceleration of a vehicle that actually rotates and torque of opposite driving wheels of the vehicle may be adjusted or motor rotation of a steering wheel to realize the target value and, accordingly, influence of slip during vehicle rotation may be removed and, in this case, the radius of curvature of the vehicle that actually rotates may correspond to the target radius of curvature set via manipulation of the steering wheel of the vehicle. Accordingly, the apparatus and method for controlling rotation of a vehicle in consideration of slip may enhance vehicle running stability and allow a driver to feel comfort.

Although the present disclosure has been shown and described with respect to exemplary embodiments, it will be apparent to those having ordinary skill in the art that the present disclosure may be variously modified and altered without departing from the spirit and scope of the present disclosure as defined by the following claims.

What is claimed is:

1. An apparatus for controlling rotation of a vehicle in consideration of slip, comprising:
    a radius of curvature setting unit configured to set a target radius of curvature of rotation of the vehicle while the vehicle is being driven;
    a radius of curvature calculation unit configured to estimate an actual radius of curvature of a traveling vehicle based on forward speed and lateral acceleration of the vehicle; and
    a radius of curvature adjustment unit configured to adjust a yaw direction rotation moment of the vehicle based on a difference between the target radius of curvature set by the radius of curvature setting unit and the estimated radius of curvature estimated by the radius of curvature calculation unit to adjust the radius of curvature of rotation of the vehicle.

2. The apparatus of claim 1, wherein the radius of curvature calculation unit is configured to estimate a radius of curvature according to an equation $$\rho = \frac{V_x^2}{A_y}$$

based on the forward speed and the lateral acceleration, where $\rho$ is an estimated radius of curvature, $V_x$ is the forward speed, and $A_y$ is the lateral acceleration.

3. The apparatus of claim 1, wherein the forward speed is detected by a speedometer installed within the vehicle and wherein the lateral acceleration is detected by a gyro sensor installed within the vehicle.

4. The apparatus of claim 1, wherein the radius of curvature setting unit is configured to set the target radius of curvature based on a steering angle via manipulation of a steering wheel of the vehicle using a data map including a predetermined relationship between the steering angle and the target radius of curvature.

5. The apparatus of claim 1, wherein the radius of curvature setting unit is configured to set the target radius of curvature according to an equation $$\rho^* = \frac{V_{x0}}{\gamma_0}$$

where $\rho^*$ is the target radius of curvature, $V_{x0}$ is forward speed of the vehicle, and $\gamma_0$ is a yaw rate of the vehicle.

6. The apparatus of claim 1, wherein the radius of curvature adjustment unit includes a proportional integral controller configured to determine a target value of a yaw direction rotation moment of the vehicle to cause the difference between the target radius of curvature and the estimated radius of curvature to be 0.

7. The apparatus of claim 6, wherein the radius of curvature adjustment unit is configured to distribute torque of left and right driving motors of the vehicle in a range of a torque command value of the vehicle to generate a yaw direction rotation moment of the vehicle that corresponds to the target value.

8. The apparatus of claim 1, wherein the radius of curvature adjustment unit is configured to adjust a rotation direction and rotation size of a steering motor of the vehicle to generate a yaw direction rotation moment of the vehicle that corresponds to the target value.

9. A method of controlling rotation of a vehicle in consideration of slip, comprising:
   setting, by a controller, a target radius of curvature of rotation of the vehicle while the vehicle is being driven;
   estimating, by the controller, an actual radius of curvature of a traveling vehicle based on forward speed and lateral acceleration of the vehicle; and
   adjusting, by the controller, a yaw direction rotation moment of the vehicle based on a difference between the target radius of curvature and the estimated radius of curvature and a torque command value of the vehicle to adjust the radius of curvature of rotation of the vehicle.

10. The method of claim 9, wherein the estimating includes:
   estimating, by the controller, a radius of curvature according to an equation $$\rho = \frac{V_x^2}{A_y}$$

based on the forward speed and the lateral acceleration,
   wherein $\rho$ is an estimated radius of curvature, $V_x$ is the forward speed, and $A_y$ is the lateral acceleration.

11. The method of claim 9, wherein the setting of the target radius of curvature includes:
   setting, by the controller, the target radius of curvature based on a steering angle via manipulation of a steering wheel of the vehicle using a data map including a predetermined relationship between the steering angle and the target radius of curvature.

12. The method of claim 9, wherein the setting of the target radius of curvature includes:
   setting, by the controller, the target radius of curvature according to an equation $$\rho^* = \frac{V_{x0}}{\gamma_0}$$

wherein $\rho^*$ is the target radius of curvature, $V_{x0}$ is forward speed of the vehicle, an $\gamma_0$ is a yaw rate of the vehicle.

13. The method of claim 9, wherein the adjusting of the radius of curvature includes:
   determining, by the controller, a target value of a yaw direction rotation moment of the vehicle to cause the difference between the target radius of curvature and the estimated radius of curvature to be 0 via proportional integral control.

14. The method of claim 13, wherein the adjusting of the radius of curvature includes:
   distributing, by the controller, torque of left and right driving motors of the vehicle in a range of a torque command value of the vehicle to generate a yaw direction rotation moment of the vehicle that corresponds to the target value.

15. The method of claim 13, wherein the adjusting of the radius of curvature includes:
   adjusting, by the controller, a rotation direction and rotation size of a steering motor of the vehicle to generate a yaw direction rotation moment of the vehicle that corresponds to the target value.

* * * * *